(12) United States Patent
Karin et al.

(10) Patent No.: US 7,037,012 B2
(45) Date of Patent: May 2, 2006

(54) SCANNING MECHANISM FOR HIGH-SPEED HIGH-RESOLUTION SCANNING

(75) Inventors: Jacob Karin, Ramat Gan (IL); Amnon Shtein, Herzlia (IL); Miki Retter, Tel Aviv (IL); Amir Ziv-Av, Kiryat Ono (IL); Gilad Golan, Ra'anana (IL)

(73) Assignee: Ziv-Av Engineering Ltd., Beerot Yitzhak (IL)

( * ) Notice: Subject to any disclaimer, the term of this patent is extended or adjusted under 35 U.S.C. 154(b) by 119 days.

(21) Appl. No.: 10/370,472

(22) Filed: Feb. 24, 2003
(Under 37 CFR 1.47)

(65) Prior Publication Data

US 2004/0165923 A1 Aug. 26, 2004

(51) Int. Cl.
*B41J 11/22* (2006.01)
(52) U.S. Cl. ............... 400/352; 400/353; 400/354; 355/53; 358/497

(58) Field of Classification Search ............... 400/352, 400/353, 354; 358/497; 355/53
See application file for complete search history.

(56) References Cited

U.S. PATENT DOCUMENTS

| 4,781,067 | A | 11/1988 | Cichanski |
| 6,396,566 | B1 | 5/2002 | Ebinuma et al. |
| 6,538,719 | B1 * | 3/2003 | Takahashi et al. ............ 355/53 |
| 6,556,279 | B1 * | 4/2003 | Meisburger et al. .......... 355/69 |
| 6,778,260 | B1 * | 8/2004 | Blaesing-Bangert et al. .. 355/72 |
| 6,885,430 | B1 * | 4/2005 | Tanaka et al. ................ 355/53 |
| 6,903,467 | B1 * | 6/2005 | Hazelton ..................... 310/12 |
| 6,917,412 | B1 * | 7/2005 | Poon et al. ................... 355/72 |
| 6,927,505 | B1 * | 8/2005 | Binnard et al. ............... 310/12 |

* cited by examiner

*Primary Examiner*—Andrew H. Hirshfeld
*Assistant Examiner*—Dave A. Ghatt
(74) *Attorney, Agent, or Firm*—Mark M. Friedman

(57) ABSTRACT

A scanning system for use in inspecting or writing on a substrate minimizes vibrations by applying movement-actuating forces directly between a carriage and a countermass which are both free to move along parallel tracks. Forces for decelerating and accelerating the scanning carriage are preferably applied along a minor part of a length of movement of the carriage. The carriage is then isolated from forces applied parallel to the track while moving along a major part of its length of movement. As a result, the carriage travels smoothly with approximately uniform speed during it's operative pass, without suffering from vibrations introduced by direct closed-loop feedback control.

16 Claims, 9 Drawing Sheets

SCANNING MECHANISM FOR HIGH-SPEED HIGH-RESOLUTION SCANNING

FIELD AND BACKGROUND OF THE INVENTION

The present invention relates to scanner mechanisms providing both high speed and high resolution. More specifically the invention is directed to high precision scanners used in the art of integrated circuit manufacture and inspection.

In order to provide a high resolution scanner (on the order of nanometer resolution) it is important to know the location of the scanner head at all times. To provide both high speed and high resolution the scanner must traverse the inspection zone in a minimum amount of time, stop, and return in the opposite direction for the next scan.

The production of integrated circuits is accomplished by photolithographic processes on wafer substrates and entails precise alignment of exposure masks. Precise alignment is difficult to accomplish in environments susceptible to vibration. In addition to the manufacturing steps involved, inspection of the wafer is also necessary both during manufacturing and following completion of the process. Again, inspection entails precise alignment of the inspection scanner. In order to exposure or inspect a wafer there must be relative motion between the operating mechanism and the wafer and this may be accomplished by holding the scan head stationary and moving the wafer or by holding the wafer stationary and moving the head, or both. In either case motion is required and motion induces vibration.

Due to the reduction of scale in modern IC manufacturing processes, even small vibrations may render a chip useless. As components shrink, the dimensions become sufficiently small that misalignment may occur if the resolution of the system is not in the nanometer range. Small vibrations may "shake" the apparatus so that the device is rendered useless below a specific resolution. As component dimensions shrink, the problem becomes more severe.

Vibration may be dealt with in one of two ways. Either vibration is allowed and vibration suppression is used or active vibration cancellation may be employed. Vibration suppression entails the use of dampeners (shock absorbers, rubber mounts, high mass bases, etc.). Vibration cancellation entails determining the characteristics of a vibration source and generating a secondary source of equal and opposite magnitude thereby canceling the vibration and not requiring isolation in the first place.

FIG. 1 is a schematic representation of the concept of active vibration cancellation as implemented in various prior references. A carriage 10 is driven by an actuator 12 to move through a desired scanning motion relative to a fixed base 14. Carriage 10 has a mass $M_1$ and moves with a velocity $v_1$ along a predefined line of motion. Acceleration of carriage 10 is achieved by forces provided by actuator 12 which, according to Newtonian laws of motion, result in equal but opposite reaction forces transmitted via the actuator to base 14. In order to cancel vibrations caused by these reaction forces, the system includes a countermass 16 which is driven by a countermass actuator 18 to move along a path parallel to the line of motion of carriage 10. If countermass actuator 18 is made to generate forces equal to, but opposite to those generated by actuator 12, the reaction forces on base 14 are also equal but opposite, and cancel out.

It should be noted that the active vibration cancellation described here inherently causes oscillating stress patterns in the base, thereby rendering it virtually impossible to completely eliminate vibrations. Furthermore, although theoretically effective to cancel much vibration, the arrangement of FIG. 1 is far from simple to implement. Specifically, when working at very high resolutions, effective balancing of forces generated by two actuators becomes increasingly difficult. Any imbalance in forces or imperfect synchronization of the forces will result in net forces on the base which will cause vibrations. Even where effective balancing can be achieved, it requires complex precautions and costly equipment to achieve the required precision.

A further limitation of conventional high resolution scanners is the precision of the drive system itself and the control system at nanometer resolution. Even the most precise actuators available used under rigorous closed-loop control cannot reliably and stably control a scanning head at nanometer resolution. The problems of precision and stability are further exacerbated as the scanning speed requirements increase. The result is typically that the control system itself introduces vibration to the scanning system.

There is therefore a need for a high-resolution scanning system which would eliminate or cancel vibration without transferring forces via a base, thereby reliably eliminating substantially all vibration from the base, and which would achieve reliable nanometer-order resolution of the scanning head without closed-loop feedback position control.

SUMMARY OF THE INVENTION

The present invention is a scanning mechanism for moving a carriage across a substrate for inspecting or writing on the substrate.

According to the teachings of the present invention there is provided, a scanning mechanism for moving a carriage across a substrate for inspecting or writing on the substrate, the scanning mechanism comprising: (a) a linear track; (b) a carriage cooperating with the linear track so as to be freely movable along the linear track; and (c) a motion reversal arrangement configured to apply force to the carriage when the carriage is moving in a first direction along the linear track so as to stop the carriage and accelerate the carriage in the opposite direction along the linear track, characterized in that the carriage reversal arrangement is configured to apply the force within two acceleration regions, the two acceleration regions being separated by an intermediate region, the carriage being substantially isolated from forces applied parallel to the track while moving along the track within the intermediate region.

According to a further feature of the present invention, the carriage supports optical components forming part of an optical system for inspecting or writing on a substrate.

According to a further feature of the present invention, the linear track is defined by at least two elongated polished surfaces of a granite slab.

According to a further feature of the present invention, the carriage cooperates with the linear track via a plurality of air bearings.

According to a further feature of the present invention, the carriage is untethered.

According to a further feature of the present invention, the motion reversal arrangement includes: (a) a countermass structure slidingly mounted relative to a base so as to be slidable along a path parallel to the linear track; and (b) an actuator system deployed for generating acceleration of the carriage relative to the countermass structure.

According to a further feature of the present invention, the countermass has a mass at least five times greater than a mass of the carriage.

According to a further feature of the present invention, the carriage and the countermass together form an inertial system which is substantially isolated from externally applied forces parallel to the track.

According to a further feature of the present invention, the countermass is substantially isolated from force transfer with the base parallel to the track.

According to a further feature of the present invention, a center-of-mass of a combination of the carriage and the countermass remains substantially stationary during the scanning movement.

According to a further feature of the present invention, a center-of-mass of the carriage, a center-of-mass of the countermass and a line of action of forces generated by the actuator system are all collinear.

According to a further feature of the present invention, there is also provided a path length adjustment mechanism adapted to vary a distance between at least two parts of the actuator system, thereby varying a length of movement of the carriage.

According to a further feature of the present invention, there is also provided a base tilting mechanism configured to selectively generate an inclination of the linear path relative to a local horizontal.

According to a further feature of the present invention, the actuator system includes a pair of momentum transfer configurations deployed so as to transiently convert at least part of kinetic energy of relative motion between the carriage and the countermass structure into potential energy and then release at least a portion of the potential energy as kinetic energy.

According to a further feature of the present invention, the momentum transfer configurations store the potential energy by compression of a quantity of air.

According to a further feature of the present invention, each of the momentum transfer configurations includes a parallel-walled receptacle associated with a first of the carriage and the countermass, and a complementary plunger associated with a second of the carriage and the countermass, relative motion between the carriage and the countermass causing mating of the plunger and the parallel-walled receptacle so as to trap the quantity of air.

According to a further feature of the present invention, there is also provided an injection system associated with the countermass and deployed for selectively add to the trapped quantity of air while the parallel-walled receptacle and the plunger are mated.

According to a further feature of the present invention, there is also provided a control system associated with the injection system, the control system including a sensor arrangement deployed for deriving motion information indicative of motion of the carriage along the track, the control system being responsive to an output from the sensor arrangement to control the injection system so as to maintain a desired scanning speed of the carriage.

There is also provided according to the teachings of the present invention, a scanning mechanism for moving a carriage across a substrate for inspecting or writing on the substrate, the scanning mechanism comprising: (a) a base; (b) a countermass structure slidingly mounted relative to the base so as to be slidable along a linear path; (c) a linear track associated with one of the base and the countermass structure, the linear track being parallel to the linear path; (d) a carriage cooperating with the linear track so as to be freely movable along the linear track; and (e) an actuator system deployed for generating acceleration of the carriage relative to the countermass structure, wherein the carriage and the countermass structure together form an inertial system which is substantially isolated from externally applied forces parallel to the track.

According to a further feature of the present invention, the carriage supports optical components forming part of an optical system for inspecting or writing on a substrate.

According to a further feature of the present invention, the base includes a granite slab polished to provide at least two elongated planar surfaces defining the linear track.

According to a further feature of the present invention, the carriage cooperates with the linear track via a plurality of air bearings.

According to a further feature of the present invention, the carriage is untethered.

According to a further feature of the present invention, the countermass has a mass at least five times greater than a mass of the carriage.

According to a further feature of the present invention, a center-of-mass of a combination of the carriage and the countermass remains substantially stationary during the scanning movement.

According to a further feature of the present invention, a center-of-mass of the carriage, a center-of-mass of the countermass and a line of action of forces generated by the actuator system are all collinear.

According to a further feature of the present invention, there is also provided a base tilting mechanism configured to selectively generate an inclination of the linear path relative to a local horizontal.

According to a further feature of the present invention, the actuator system includes a pair of momentum transfer configurations deployed so as to transiently convert kinetic energy of relative motion between the carriage and the countermass structure into potential energy and then release at least a portion of the potential energy as kinetic energy.

According to a further feature of the present invention, there is also provided a path length adjustment mechanism adapted to vary a distance between at least two parts of the momentum transfer configurations, thereby varying a length of movement of the carriage.

According to a further feature of the present invention, the momentum transfer configurations store the potential energy by compression of a quantity of air.

According to a further feature of the present invention, each of the momentum transfer configurations includes a parallel-walled receptacle associated with a first of the carriage and the countermass, and a complementary plunger associated with a second of the carriage and the countermass, relative motion between the carriage and the countermass causing mating of the plunger and the parallel-walled receptacle so as to trap the quantity of air.

According to a further feature of the present invention, there is also provided an injection system associated with the countermass and deployed for selectively add to the trapped quantity of air while the parallel-walled receptacle and the plunger are mated.

According to a further feature of the present invention, there is also provided a control system associated with the injection system, the control system including a sensor arrangement deployed for deriving motion information indicative of motion of the carriage along the track, the control system being responsive to an output from the sensor arrangement to control the injection system so as to maintain a desired scanning speed of the carriage.

According to a further feature of the present invention, there is also provided the actuator system is configured to apply a force to the carriage along a minor part of a length of movement of the carriage, the carriage being substantially isolated from forces applied parallel to the track while moving along a major part of the length of movement.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a scanning mechanism for moving a carriage across a substrate for inspecting or writing on the substrate.

The principles and operation of scanning mechanisms according to the present invention may be better understood with reference to the drawings and the accompanying description.

Conceptual Introduction

Figure 2A:
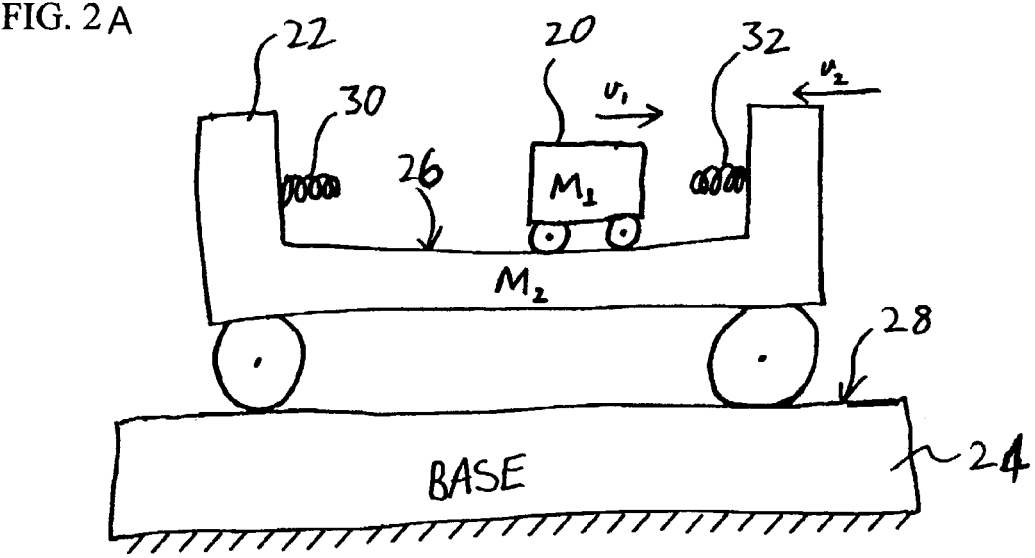
FIGS. 2A and 2B are schematic illustrations of a scanning mechanism, constructed and operative according to the teachings of the present invention, in which a carriage and countermass together form a kinetic system substantially inertially isolated from a base.
Figure 2B:
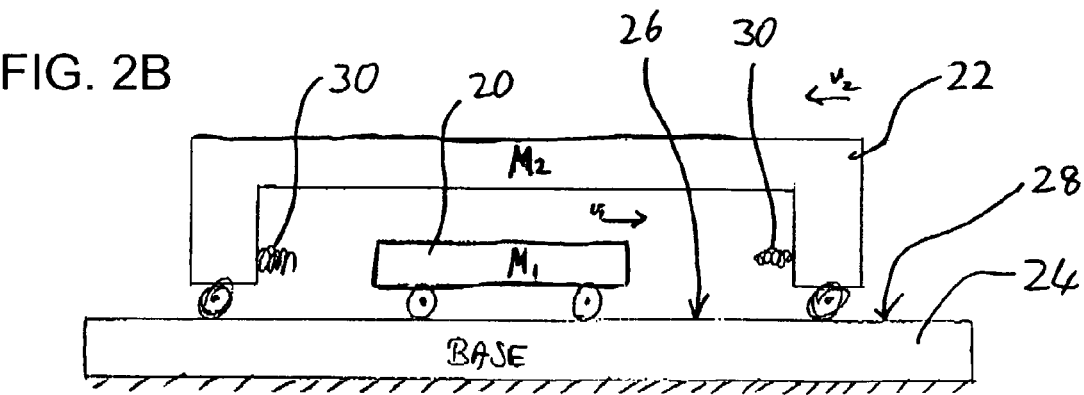
Figure 3:
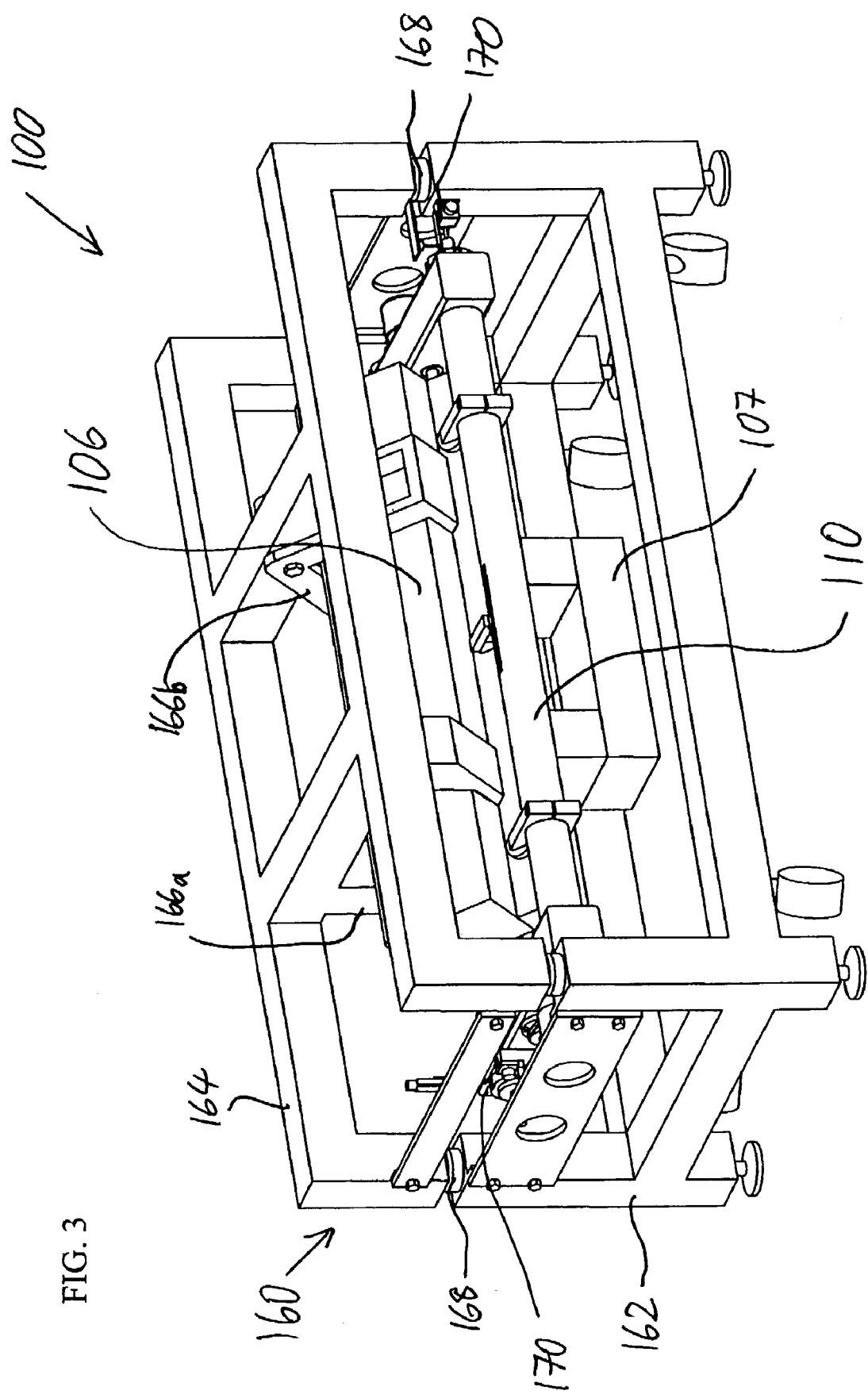
FIG. 3 is an isometric view of a preferred implementation of a scanner mechanism, constructed and operative according to the teachings of the present invention.
Figure 4:
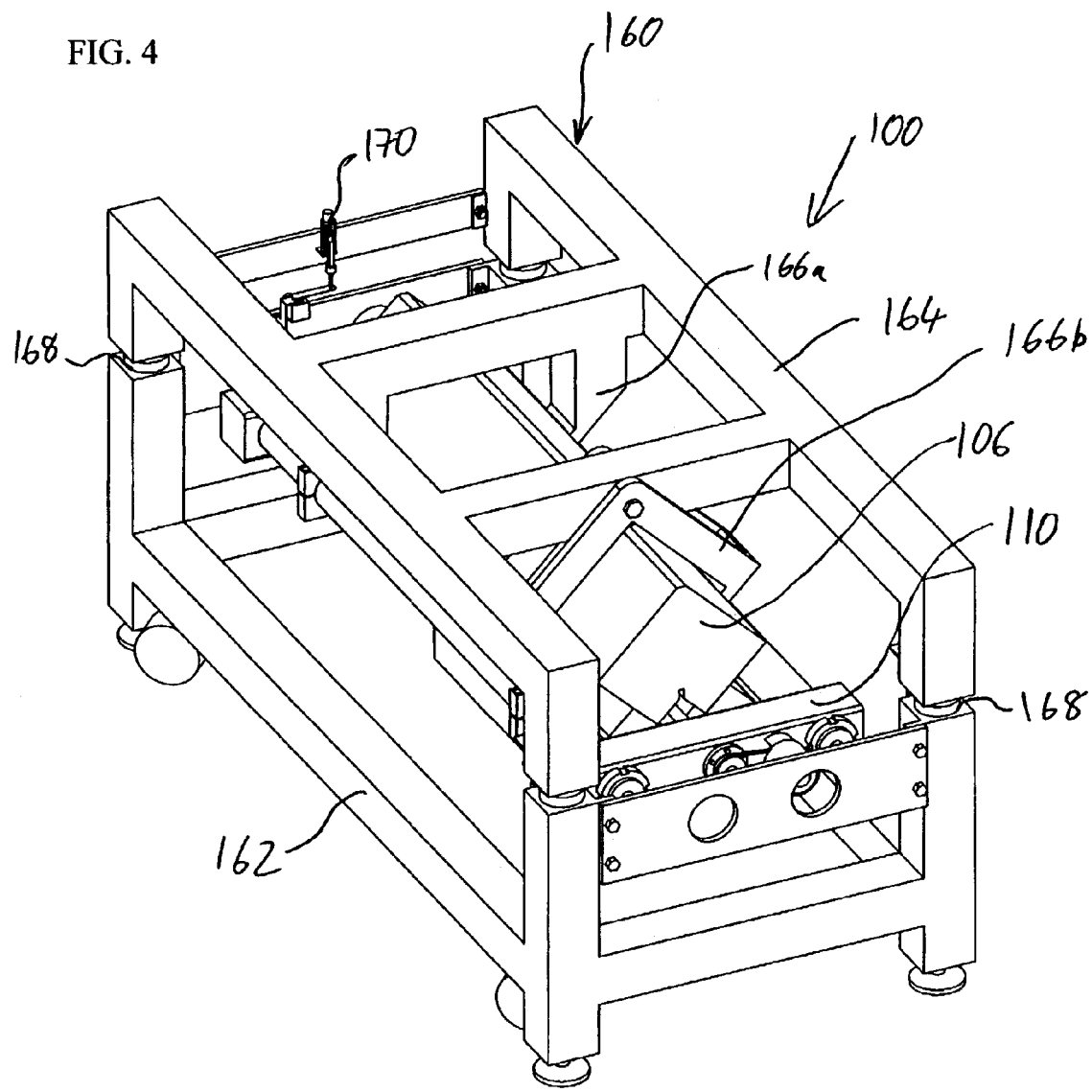
FIG. 4 is a further isometric view of the scanner mechanism of FIG. 3.

Referring now to the drawings, FIGS. 2A and 2B illustrate schematically two aspects of the present invention. Specifically, the present invention provides two fundamental innovations to address two of the aforementioned problems. Each of these innovations may be used to advantage alone, but are exemplified in the following description in the context of particularly preferred embodiments which combine the two innovations. Stated generally, the two innovations are as follows.

Kinetically Isolated Balanced Scanning System: vibrations are minimized by applying movement-actuating forces directly between a carriage and a countermass which are both mounted for substantially free linear motion along parallel tracks. The carriage and countermass thus together form an inertial system which is substantially isolated from externally applied forces parallel to the track, and does not transmit forces outwards, thereby substantially preventing generation of vibration.

Free-Gliding Scanner Carriage: forces for decelerating and accelerating the scanning carriage are applied only along part of a length of movement of the carriage along a track. The carriage is then substantially isolated from forces applied parallel to the track while moving along the remainder part of its length of movement. As a result, the carriage glides smoothly during its operative pass without introduction of vibrations caused by direct closed-loop feedback control and the associated motors and actuators. The scanning speed remains substantially constant during each pass, facilitating accurate writing or reading with uniform illumination.

Figure 1:
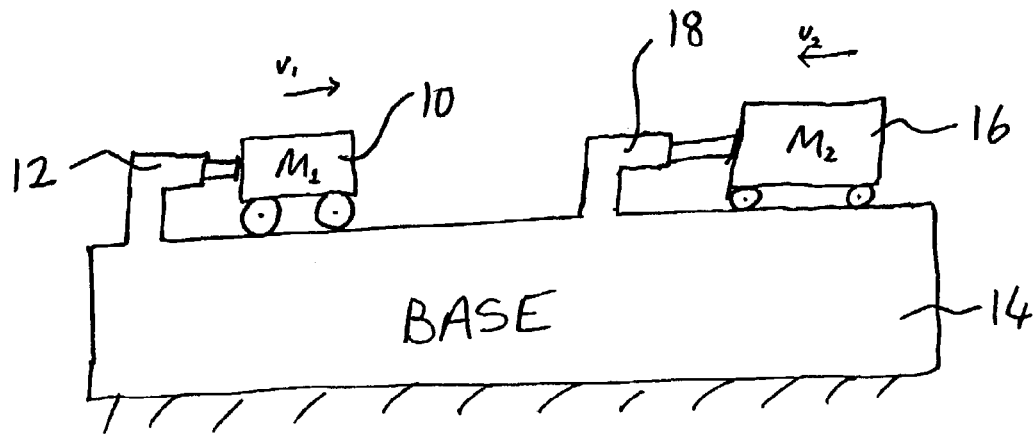
FIG. 1 is a schematic illustration of a prior art scanning system with active vibration cancellation.

Thus, referring specifically to FIGS. 2A and 2B, there are shown schematically two variants of a carriage 20 and a countermass 22 which both move freely relative to a base 24 along parallel tracks 26 and 28, respectively. An actuator system (represented here by springs 30, 32) applies equal and opposite forces directly between carriage 20 and countermass 22 at each end of the scanning path such that the combination of carriage 20 and countermass 22 undergoes no net acceleration during normal reciprocating scanning. In contrast to the prior art arrangement of FIG. 1 where the "cancellation" forces are transferred through the base, this arrangement inherently ensures cancellation of forces directly between the carriage and countermass with substantially no transfer of acceleration forces to the base. Vibration of base 24 is thus substantially eliminated. (The issues of how motion is initiated in such a system, and how momentum is maintained despite frictional losses, will be addressed below in the detailed description.)

The second innovation is also illustrated in FIGS. 2A and 2B. Clearly, springs 30 and 32 are only operative once carriage 20 comes in contact with them near the extremes of the scanning motion. For the remaining part of the scanning motion, carriage 20 essentially glides freely along track 26. Given sufficiently low frictional losses, the velocity during this free gliding motion is approximately uniform, thereby facilitating accurate measurements without closed-loop feedback position control.

Parenthetically, it will be noted that FIGS. 2A and 2B differ in the placing of track 26 on which carriage 20 moves. In FIG. 2A, track 26 is shown as formed on countermass 22 which itself moves relative to base 24 along track 28. In FIG. 2B, on the other hand, both tracks 26 and 28 are implemented directly in relation to base 24, in this example as parts of a single continuous track. While both options fall within the broad scope of the present invention, the option of FIG. 2B is believed to be preferable in that it tends to minimize imprecision of the carriage position.

As mentioned earlier, the two fundamental innovations of the present invention can each be implemented independently of the other. For example, a carriage, countermass and motion drive system can clearly be implemented as a balanced-momentum system kinetically isolated from a base even where a closed-loop feedback positioning system is used. Similarly, the concept of using a free-gliding scanner carriage can be used to advantage without the vibration containment configuration of the present invention. By way of non-limiting example, the invention will be illustrated in the context of particularly preferred embodiments in which both fundamental innovations are combined. It is, however, well within the capabilities of one ordinarily skilled in the art to implement these innovations individually in the context of otherwise conventional systems.

Definitions Before turning to certain preferred embodiments in detail, it will be useful to define various terminology as used herein in the description and claims. Firstly, reference is made herein to one or more "linear track". For the purpose of the present description and claims, a linear track is taken to be any structure which defines a linear path of relative motion between two bodies. A track thus defined may be implemented using many different structures including, but not limited to, rails, ridges and grooves. For particularly high precision systems, the most preferred form of track is a pair of elongated non-parallel planar surfaces where the linear path corresponds to the line of intersection between the planes of the surfaces.

In a related issue, where a direction is described as "parallel to the track", the intent is that the direction is parallel to the linear path defined by the track. Furthermore, it will be appreciated that the term "parallel" includes the case of co-linearity, the latter being a special case of the former.

In a further matter of terminology, various elements or sub-systems are described herein as being "substantially isolated from forces applied parallel to the track". This terminology is used to denote an element or sub-system which is designed to approximate at least at certain times to the behavior of an inertial body unrestrained in a single dimension defined by a linear track. In practical terms, this definition may be taken to indicate that all externally applied forces are significantly smaller (by at least two, and typically more than three, orders of magnitude) than the forces used to reverse the directions of motion of the components. The "isolation" from applied forces will in practice be imperfect for one or more of the following reasons: deceleration forces resulting from friction and/or air resistance (drag); gravitational acceleration produced by small-angle temporarily-induced inclination (to be discussed below); and any small mechanical effects of electrical, optical and/or pneumatic connections required for operation of the system after precautions have been taken to reduce such forces to low values. For the purpose of the present description and claims, all such cases are to be considered "substantially isolated" as defined herein. Where it is desired to explicitly exclude the possibility of any direct mechanical connections, the term "untethered" is used.

The term "countermass" is used herein as a more precise alternative to "counterweight" since the force cancellation effect utilized by the present invention relies upon inertial mass rather than gravitational balancing. The term "countermass" is taken to refer collectively to all elements which move as a unit with the corresponding structure, whether or not they are included primarily for their contribution to the inertial mass.

The term "base" is used to refer to a static body which provides the reference position relative to which reciprocating scanning motion occurs. The term as used herein does not imply any particular spatial relation between the components, such that the base may in fact be located mainly above the moving carriage as in the example of FIGS. 3–10 below.

Finally, where reference is made to a small induced angle of inclination, the intended range of angles is less than 5°, and preferably no more than about 2°.

First Preferred Embodiment

Turning now to FIGS. 3–10, there is shown a first preferred embodiment of a scanning mechanism, generally designated 100, constructed and operative according to the teachings of the present invention, for moving a carriage across a substrate (not shown) for inspecting or writing on the substrate. Scanning mechanism 100 is conceptually similar to the mechanism illustrated in FIG. 2B, but is implemented so as to maximize precision for high resolution, high speed scanning applications.

Figure 5:
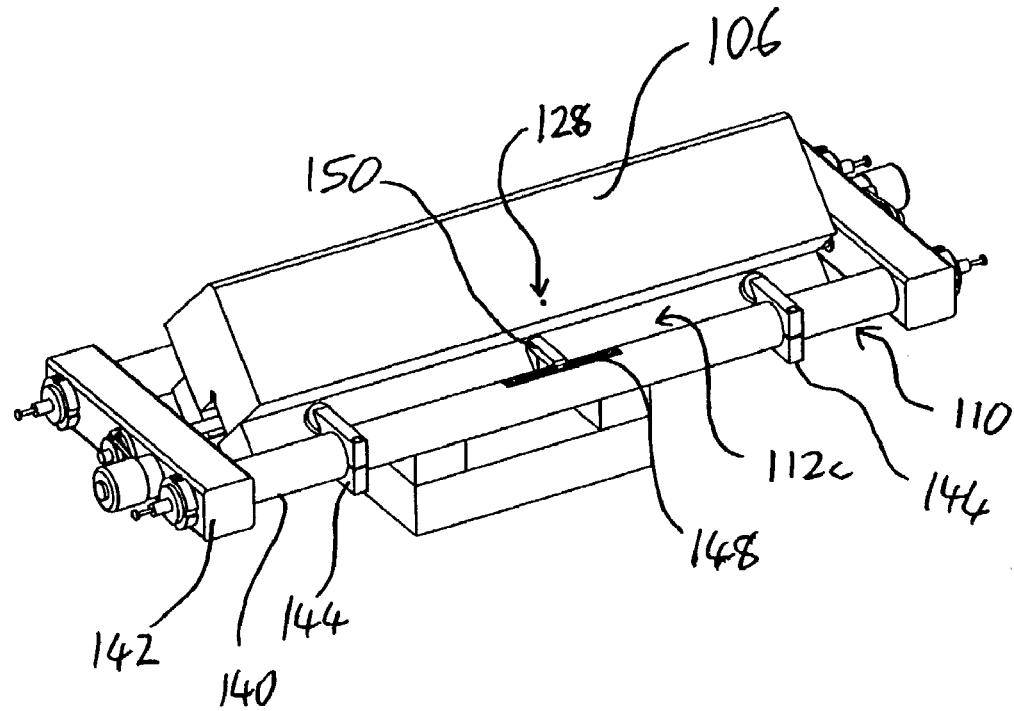
FIG. 5 is an isometric view of the scanner mechanism of FIG. 3 with a support frame removed.
Figure 6A:
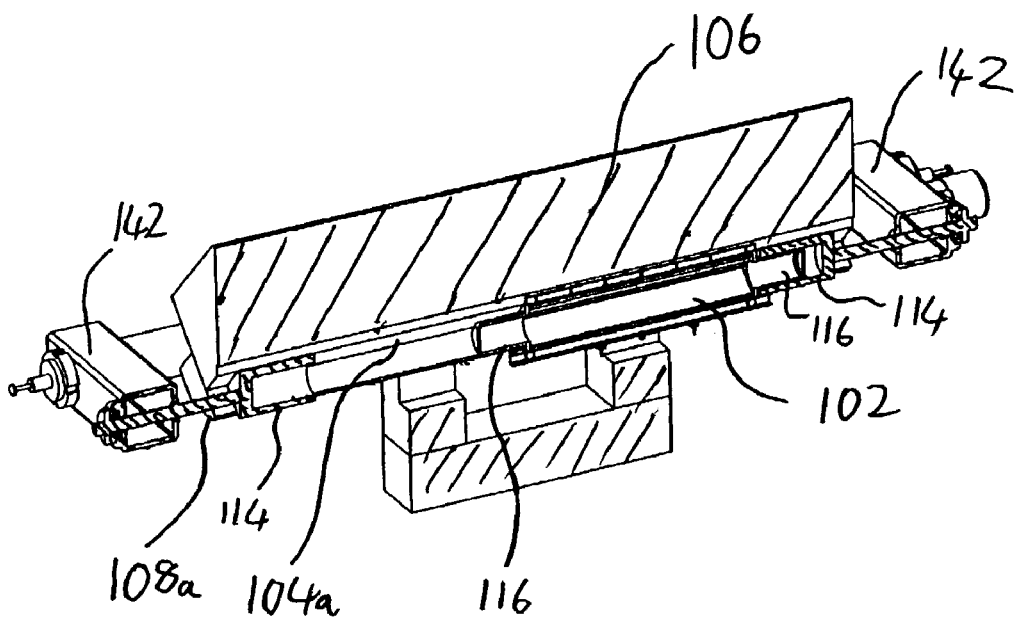
FIG. 6A is an isometric view similar to FIG. 5 cut away on a vertical plane to reveal a scanning carriage.
Figure 6B:
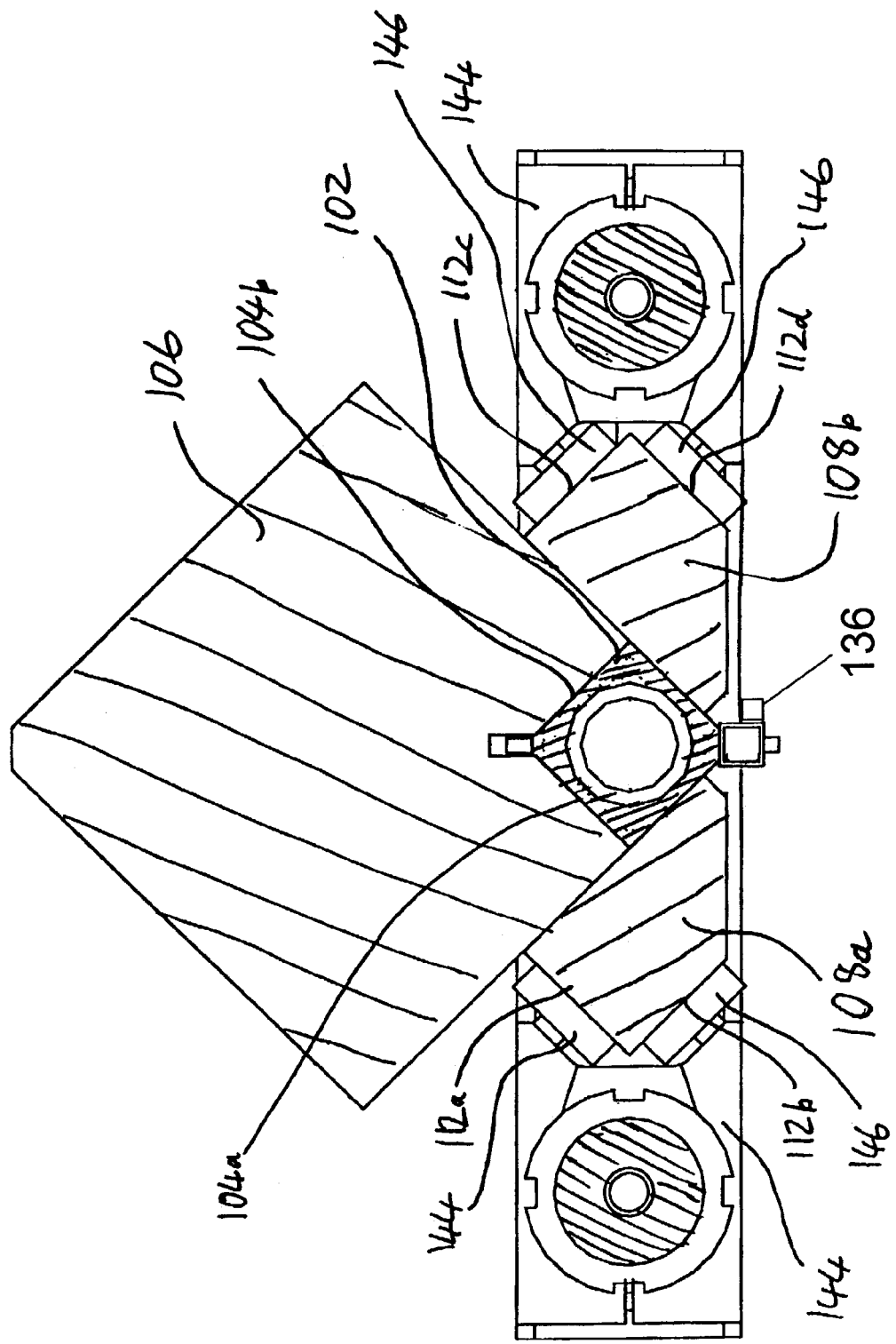
FIG. 6B is lateral cross-sectional view taken through the mechanism of FIG. 5.

The interrelation of the main operative elements of mechanism 100 is best seen in FIGS. 5, 6A and 6B. Specifically, these figures show a carriage 102 slidingly mounted within a partially enclosed track defined by at least two polished surfaces 104a, 104b of a base formed from a main granite block 106 and two side granite blocks 108a and 108b. Carriage 102 and it's associated linear bearings will be described in more detail below with reference to FIG. 9. A countermass structure 110 (shown separately in FIG. 7) is also slidingly mounted on the base, at least partially via an external track, parallel to the partially enclosed track, defined by outward facing surfaces 112a, 112b, 112c and 112d of side blocks 108a and 108b.

An actuator system is deployed for generating acceleration of carriage 102 relative to countermass structure 110. In the simplest case, the actuator system functions effectively as a pair of springs deployed in a manner similar to that described above with reference to FIGS. 2A and 2B. More preferably, the "spring" functionality is enhanced by a control arrangement which allows supply of additional energy and/or controlled damping so as to allow compensation for energy losses and to provide for adjustment of the scanning speed. For reasons of efficiency, controllability and precision, pneumatic springs and magnetic springs are believed to be preferred choices.

In the preferred case illustrated here, the actuator system is made up primarily from a pair of parallel-walled receptacles (here in the form of blocks 114 with cylindrical recesses) associated with countermass structure 110 and a pair of complementary plungers 116 associated with carriage 102. Clearly, this configuration may be reversed such that the plungers would be associated with countermass structure 110. As carriage 102 approaches one extreme of its range of motion along the partially-enclosed track, one of plungers 116 mates with the recess of facing block 114 thereby trapping air so as to form a trapped-air compression spring. The energy loss compensation and/or full controllability is preferably afforded by an air pressure control arrangement associated with each block 114 and configured to allow selective injection of pressurized air into the trapped air space or release of pressure therefrom.

Figure 9:
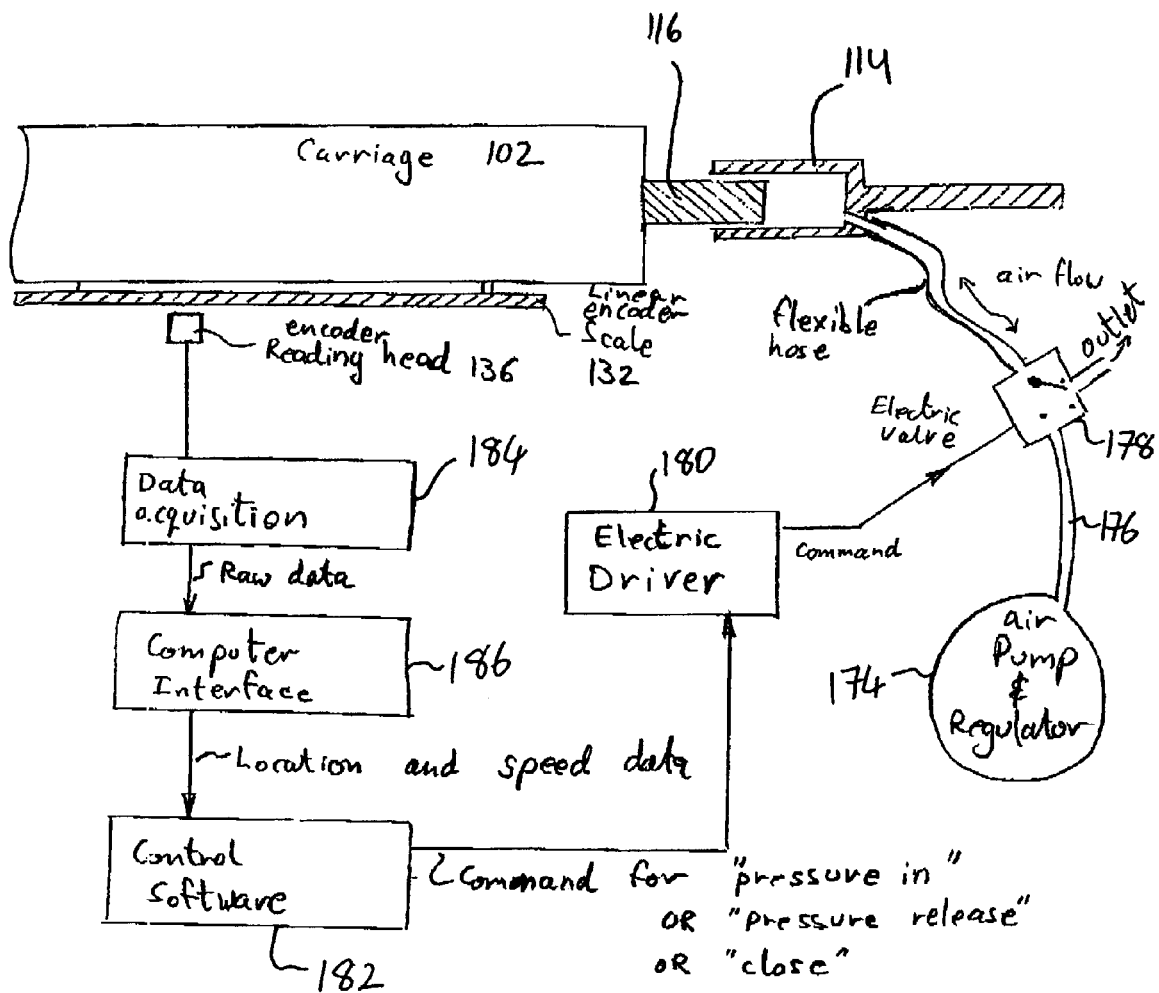
FIG. 9 is a schematic representation of a scanning speed control system for use in the scanning mechanism of FIG. 3.

FIG. 9 shows schematically an air pressure control system for controlling operation of the trapped-air compression springs. Specifically, in the implementation shown here, an air pump 174 is connected via a system of flexible hoses 176 and a three-way valve 178 to the internal volume of block 114. Electrically controlled three-way valve 178 is preferably switchable between a closed state in which plunger 116 and block 114 form a passive spring, a "pressure in" state in which pump 174 is connected to supply pressurized air into the internal volume of block 114, and a "pressure release" state in which the internal volume is vented to the atmosphere. The "pressure in" state is used to compensate for energy losses or to increase the scanning speed, while the "pressure release" state is used to "damp" action of the spring and/or momentarily to equalize pressure between the spring and the atmosphere just before plunger 16 leaves block 14 to avoid problems caused by sudden air release. Pump 174 is preferably also used to supply air pressure to the outer bearings of block 114 via additional flexible hoses (not shown).

Parenthetically, it will be noted that the use of flexible hoses for supply of air pressure does not adversely affect the free-motion of the elements, particularly for the relatively heavy countermass which undergoes only small amplitude movement. Such connections are explicitly included within the scope of elements "substantially isolated from forces parallel to the tracks" as defined herein above.

Three-way valve 178 is shown here controlled by an electric driver 180 which is operated by a control software module 182 based upon carriage location and speed data, as well as required scanning motion parameters and other relevant parameters. The location and speed data is typically derived from encoder reading head 136 (or an interferometer or other motion sensing device) which is transferred by a data acquisition module 184 via a computer interface 186 for processing to derive the inputs for control software module 182.

Figure 10:
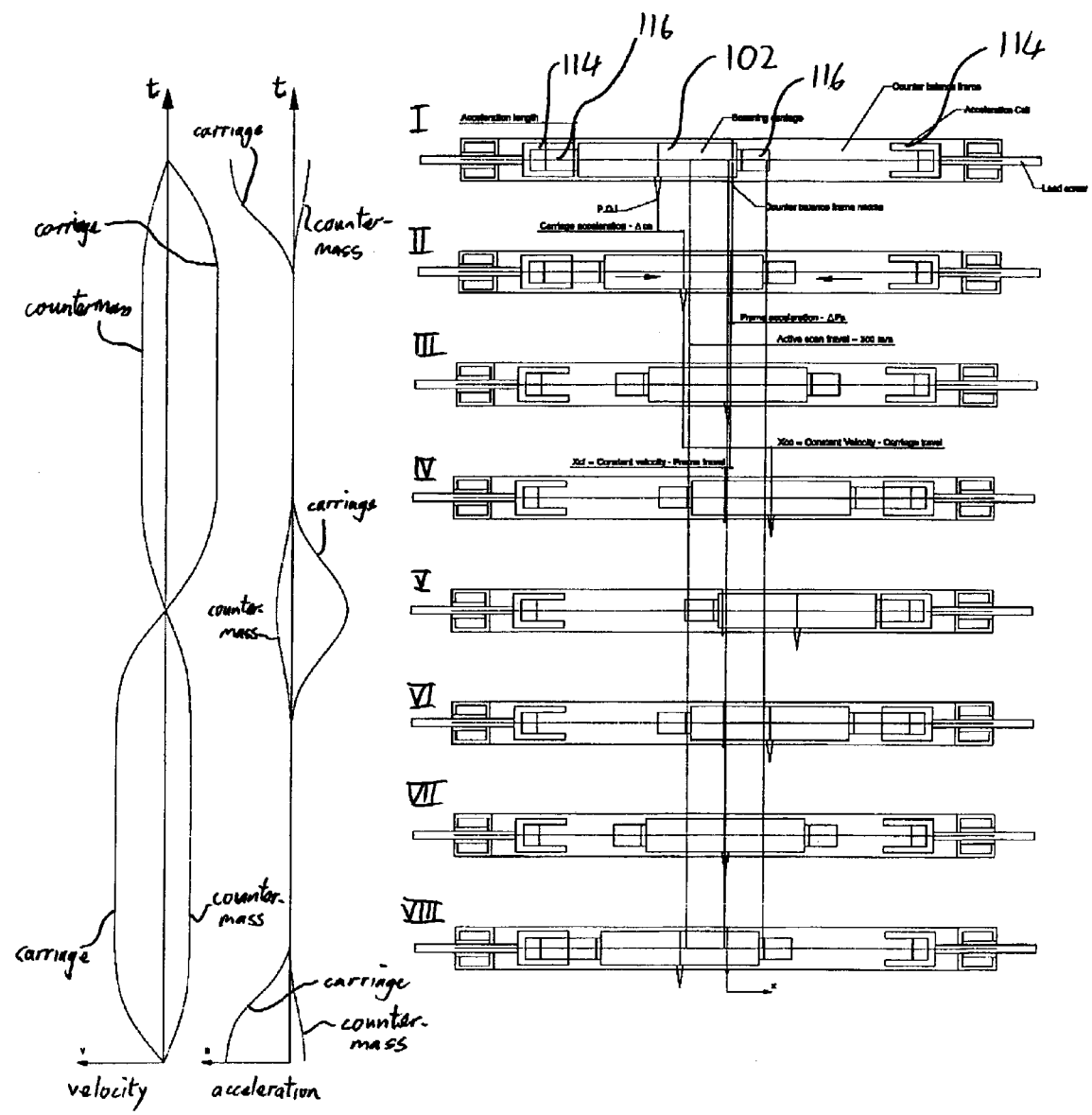
FIG. 10 is a sequence of schematic cross-sectional views showing the velocity and acceleration of the scanning carriage and countermass frame for a sequence of relative positions of the scanning carriage and countermass frame.

The operation of scanning carriage 102 and countermass structure 110 will be better understood with reference to FIG. 10. Specifically, FIG. 10 shows a sequence (labeled I–VIII) of relative positions of carriage 102 and blocks 114 of the countermass structure during operation of the scanner. In position I, scanner carriage 102 is at one extreme of its range of motion with left-hand plunger 116 inserted within the recess of left-hand block 114 and the trapped air pocket at its maximum pressure value. In this position, the air pressure generates equal and opposite forces on plunger 116 and block 114 to accelerate carriage 102 and countermass structure 110 in opposite directions. As they accelerate, the velocity increases and the air pressure and corresponding acceleration decrease until plunger 116 separates from block 114 at position II. From position II to position IV, carriage 102 continues along the partially enclosed track with substantially constant velocity, preferably as an untethered linear projectile. By use of suitable low-friction bearings, it is possible to achieve velocity which remains constant to within a few percent over a given maximum active scanning path, typically chosen to be no more than about 0.5 meter. At position IV, the right-hand plunger 116 starts to mate with the recess of the right-hand block 114, thereby trapping and compressing a pocket of air. As the air is compressed, it exerts increasing deceleration forces on both carriage 102 and countermass structure 110 until at position V they reach their extreme position and momentarily have zero relative velocity. This entire sequence then repeats in reverse, with acceleration from position V to position VI, free motion from VI to VIII, and then deceleration from VIII back to the initial extreme position I where the cycle restarts.

At this stage, it will be apparent that scanning mechanism 100 provides the benefits of both of the primary innovations described above with reference to FIGS. 2A and 2B. Specifically, the "free motion" of substantially constant velocity from position II to IV in a first direction and from position VI to VIII in the opposite direction facilitates uniform exposure at high resolution without the vibrations and other problems associated with extremely high resolution closed-loop feedback actuator systems. Furthermore, by applying acceleration forces directly between carriage 102 and countermass 110 where both are free to slide parallel to the tracks ensures that carriage 102 and 110 together form an inertial system which is substantially isolated from externally applied forces parallel to the track and does not apply any forces on other components.

Figure 8:
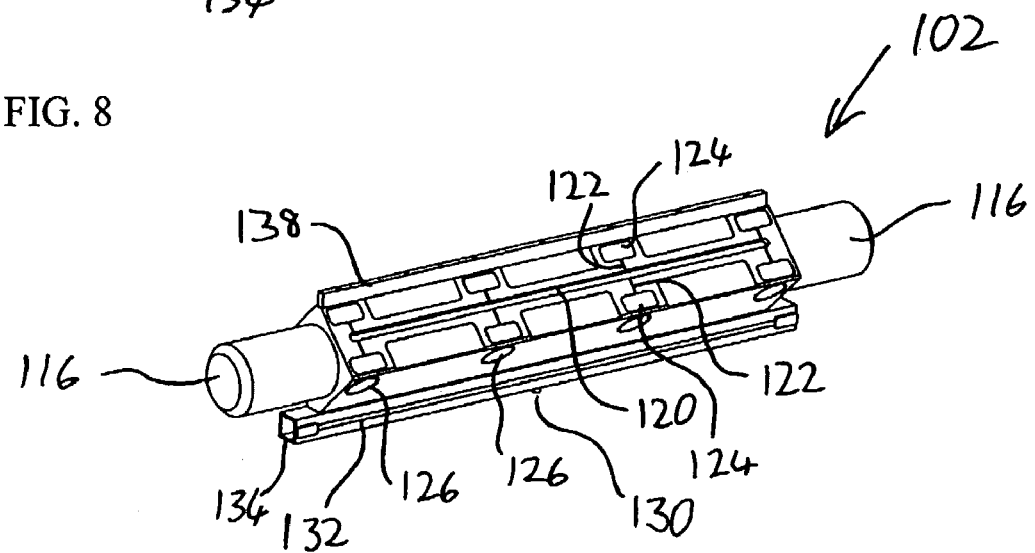
FIG. 8 is an isometric view of the scanning carriage from FIG. 5.

Turning now to the features of scanning mechanism 100 in more detail, carriage 102 is best seen in FIG. 8. In order to achieve maximum precision of the carriage alignment on the internal track, an arrangement of high-precision bearings are preferably used to define a very small clearance, preferably with a clearance no greater than about 5 μm, between the carriage and the two highly planar indexing surfaces 104a and 104b. In the preferred case illustrated here, the bearings are air bearings in which air pressure is supplied via an elongated exterior slot 120 and distributed via connecting conduits 122 to a set of air bearing pads 124. Regions of the carriage surfaces between pads 124 are preferably recessed to reduce frictional/drag effects across the very small clearance gap. Additional conduits (not shown) link air supply slot 120 with larger clearance air bearing pads 126 which serve to keep the carriage upwardly biased against the indexing surfaces. Air pressure supply to slot 120 is preferably via one or more air-supply bore 128 (FIG. 5) formed through granite block 106 so as to interconnect with slot 120 over the entire range of motion of carriage 102. In a preferred case where the length of carriage 102 is greater than the maximum scanning path length, a single air-supply bore 128 is sufficient to remain in interconnected relation with slot 120 over the entire range of motion. This elongated carriage implementation also provides advantages of stability and precision.

Although illustrated here with air bearings, it will be clear to one ordinarily skilled in the art that various alternative low-friction bearing arrangements may also be used. Non-contact bearings such as air bearings and magnetic bearings are preferred for their negligible friction. Furthermore, it will be clear that the bearing configurations may be reversed such that an arrangement of air bearing pads or other bearing components is formed on surfaces 104a and 104b. In practice, the configuration illustrated here is considered superior due to various design considerations.

Carriage 102 is configured to support optical components 130 (FIG. 8) which form at least part of an optical system for inspecting or writing on a substrate. The surface to be scanned is typically supported by a moving stage (not shown) which provides motion of the scanned surface relative to the scanning assembly in a direction perpendicular to the scanning motion. The moving stage is mounted on a hanging granite support structure 107 (FIGS. 3, 5 and 6) rigidly fixed to the base. The optical components 130 may operate as a free standing optical system with a wireless or wired data connection to an external processing system, or may form part of an optical system with additional optical components which are mounted in fixed positions relative to the base. In the latter case, optical components 130 are typically optically connected with the fixed components via a variable length optical path parallel to the direction of motion. In order to minimize generation of vibration by the stage moving mechanism, a continuous stage movement is preferably used. Details of a preferred corrective optical system for achieving rectilinear scanning with a continuous stage motion are described in co-pending U.S. patent application Ser. No. 10/156,143 which is hereby incorporated by reference in its entirety.

Carriage 102 preferably also carries at least one component of a sensor arrangement for deriving motion information (position and/or speed) indicative of motion of carriage 102 along the track relative to the base. Various suitable measurement techniques and corresponding structural components are known to one ordinarily skilled in the art. Preferred examples include, but are not limited to, optical encoders and interferometers. In the example illustrated here, one or more optical scale 132 (FIG. 8) is located on a hollow bracket 134 hanging below carriage 102 so as to read by one or more encoder head 136 (FIG. 6B) mounted on the base.

In order to avoid transfer of angular impulses to the base, it is a particularly preferred feature of the present invention that the centers-of-mass of both carriage 102 and of countermass structure 110, as well as a line of action of forces generated by the actuator system, are all collinear. To this end, carriage 102 preferably also features a top weight, implemented here as a fin 138 (FIG. 8), which counterbalances the mass of optical components 130, bracket 134 and scale 132, so as to ensure that the center-of-mass of the carriage lies on a central axis passing through the centers of plungers 116. Optionally, fin 138 may be utilized to house other functional components of carriage 102.

It will now be appreciated that, by suitable design of the bearings and optical system, it is possible to implement carriage 102 as an untethered carriage where the only forces acting upon it parallel to its free-gliding path along the track are typically air drag and friction effects.

Figure 7:
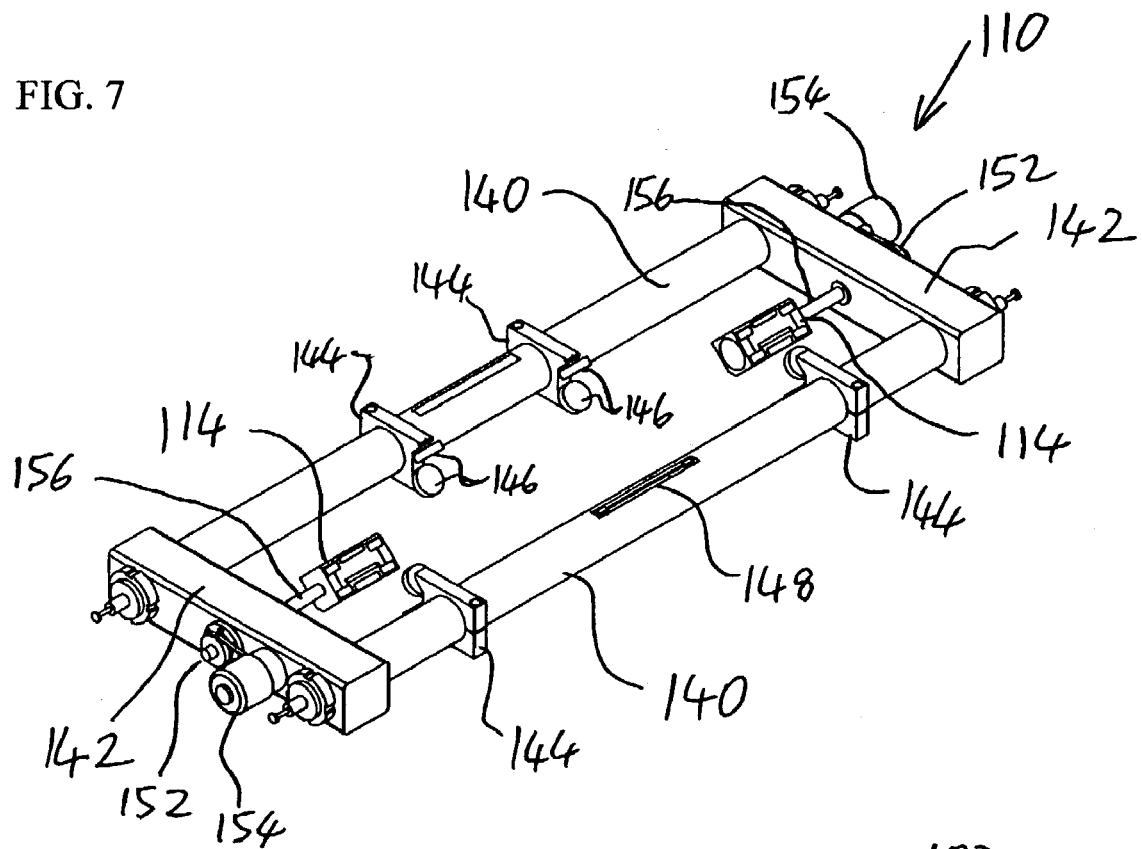
FIG. 7 is an isometric view of a countermass frame from FIG. 5.

Turning now to countermass structure 110, this is best seen in FIG. 7. The two blocks 114 are supported by a rigid, balanced, external frame formed from two elongated bars 140 and two crossbars 142. The main weight of countermass structure 110 is supported on the external track defined by surfaces 112a, 112b, 112c and 112d (FIG. 6B) by a number of low friction bearing arrangements 144. Here too, preferred choices of bearings are non contact bearing such as air bearings (pads 146 shown here) or magnetic bearings. In addition to the external track, blocks 114 are preferably provided with an arrangement of bearings similar to those of carriage 102 described above in order to ensure precise, low-friction motion of blocks 114 along the internal track in correct alignment with plungers 116. In order to accommodate any small imprecision in alignment between blocks 114 and the outer frame of the countermass structure, a projecting portion of a rod 156 supporting each block 114 is preferably mounted in such a manner as to allow slight tolerance of pivotal misalignment while ensuring a high degree of rigidity against axial or lateral displacement. As will be described below, rod 156 is preferably also designed to be extended or retracted by an adjustment mechanism, thus requiring rotatable coupling for a threaded-adjustment implementation. One preferred example of a coupling which combines all of the required mechanical properties is a coupling which employs a pair of tapered roller bearings in back-to-back configuration. Details of this and other suitable couplings will be understood by one ordinarily skilled in the art.

In order to prevent longitudinal creep of the gliding components as will be detailed below, it is important to know at least the approximate position of countermass structure 110. In the implementation shown here, this is achieved by use of a secondary scale 148 on one of bars 140 which is read by a corresponding secondary encoder head 150 mounted on side block 108b (see FIG. 5). Parenthetically, it should be noted that the total mass of countermass structure 110 is preferably at least five times greater, and more preferably at least ten times greater, than the total mass of carriage 102. As a result, the maximum range of motion required along the tracks is correspondingly less than that of carriage 102 by a factor of at least five. For this reason, scale 148 is significantly shorter than scale 132 of carriage 102.

An additional preferred feature of scanning mechanism 100 is that it allows adjustment of the length of the scanning path. In applications where a substrate or pattern to be scanned is not rectangular, much time is typically wasted by completion of a constant length scanning path over regions which need not be scanned. To address this problem, the scanning mechanisms of the present invention preferably allow for adjustment of the length of the scanning path dynamically during the scanning process to minimize total scanning time. This adjustment is preferably implemented by varying the distance between blocks 114, thereby varying the length of movement of the carriage. In the implementation shown here, this is performed by an adjustment mechanism including a threaded adjuster 152 driven by a motor 154 mounted on each crossbar 142 so as to vary a length of projecting portion of a rod 156 supporting each block 114.

To complete the description of the structure of scanning mechanism 100, it will be useful to refer back to FIGS. 3 and 4 which illustrate how main granite block 106 is suspended in an outer support structure 160. Support structure 160 is here subdivided into a lower frame 162 which stands directly on an underlying surface, and an upper frame 164 from which granite block 106 is suspended via support brackets 166a and 166b. Preferably, one bracket 166a is formed as a fixed part of upper frame 164 while the second bracket 166b is hung from a pivotal hinge, thereby ensuring stress-free three-point suspension of the granite base. Deployed between lower frame 162 and upper frame 164 are a number of high-load actuators 168 which provide a base tilting mechanism configured to selectively generate a small-angle inclination of block 106, and hence of the linear path of the carriage and countermass, relative to a local horizontal. Gauges 170 provide measurements for precise control of this temporarily induced inclination. Actuators 168 are preferably implemented as active shock-absorbers forming part of an active damping system which also provides vibration isolation from the underlying surface. Suitable active damping system components are commercially available. One suitable type is an actuator sold under the product code BIARR-1-ED and a control system model EPN, both available from Bilz, GmbH (Germany). This facility to introduce a temporary inclination of the linear path relative to the local horizontal provides a preferred technique for both initiating motion of the scanning mechanism and controlling longitudinal drift, as will now be described.

It will be noted that, under normal stable operating conditions, the center-of-mass of a combination of carriage 102 and countermass 110 remains substantially stationary during the scanning movement. In certain circumstances, however, a small net momentum along the track may occur. If unchecked, this net momentum would bring one or both of carriage 102 and countermass 110 to the mechanical limits of their range of motion which would interfere with the free-gliding scanning motion. To control such situations, actuators 168 are used to slightly lift one end of the granite block. The resulting small gradient causes a slight gravitational bias equally on both the carriage and the countermass. The angle is kept sufficiently small that the gravitationally induced acceleration is smaller (by at least two, and preferably at least three, orders of magnitude) than the acceleration of the carriage during reversal of its direction of travel, thereby maintaining the free-gliding properties of the invention. This effect can be used to cancel any net momentum of the carriage-countermass system, and to return their combined center-of-mass to the central region of their range of motion.

The induced inclination feature may also be used to advantage for initiating the scanning motion from stationary. The aforementioned air injection system may be used to accelerate both the carriage and countermass from stationary, but only after one plunger 116 has been brought into engagement within the corresponding block 114. This may be achieved by selectively activating the air bearings of carriage 102 while countermass 110 remains in frictional contact with its track. If an inclination is induced in this situation, the carriage will move under gravitational bias to one extreme of its motion. The air pressure injection system is preferably configured to open the trapped air-pocket volume to the atmosphere, thereby allowing the plunger to proceed freely to its fully engaged position. Subsequent injection of air pressure into the receptacle of block 114 will then impart sufficient initial velocity to both the carriage and the countermass to begin the reciprocating scanning motion. The control system then adjusts the scanning speed by subsequent air-pressure injection at one or both ends of the motion so that a desired scanning velocity is reached and maintained.

Second Preferred Embodiment

The granite-block based embodiment of the present invention described in FIGS. 3–10 is considered highly advantageous for maximizing precision of the scanning mechanism of the present invention. Nevertheless, it should be appreciated that the principles of the present invention can be implemented in many different structures suited to different design requirements and budgets. By way of one additional example, FIGS. 11 and 12 illustrate a compact, lightweight scanning mechanism which includes many of the main features of the present invention.

Figure 11:
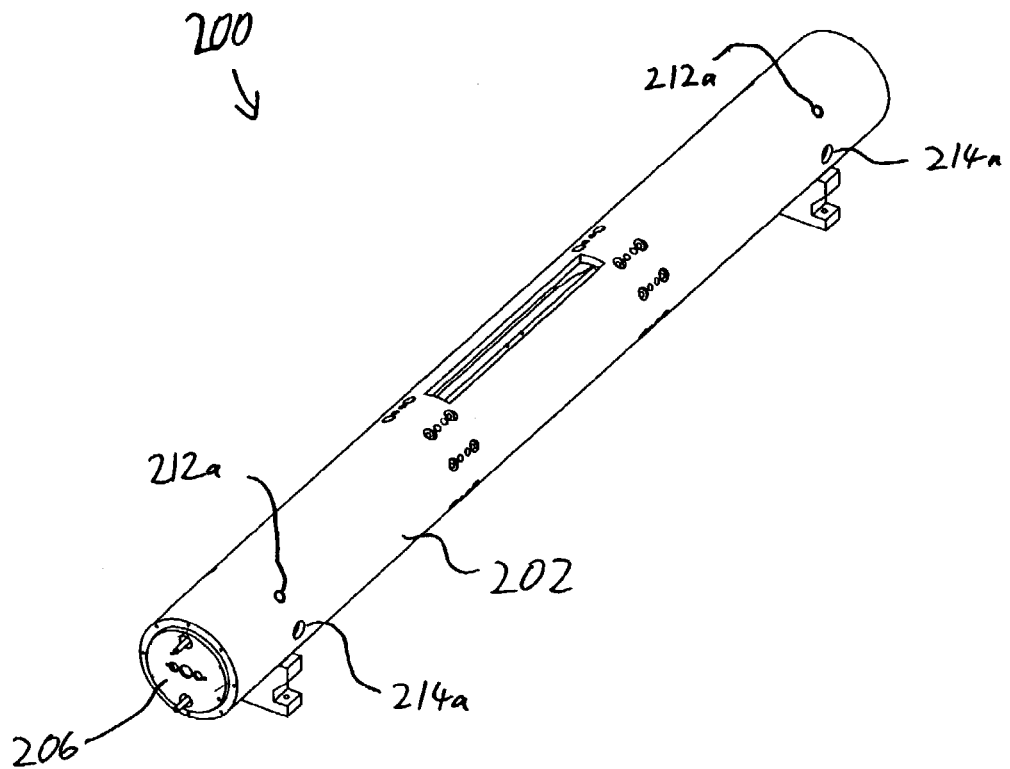
FIG. 11 is an isometric view of an alternative preferred implementation of a scanner mechanism, constructed and operative according to the teachings of the present invention.
Figure 12:
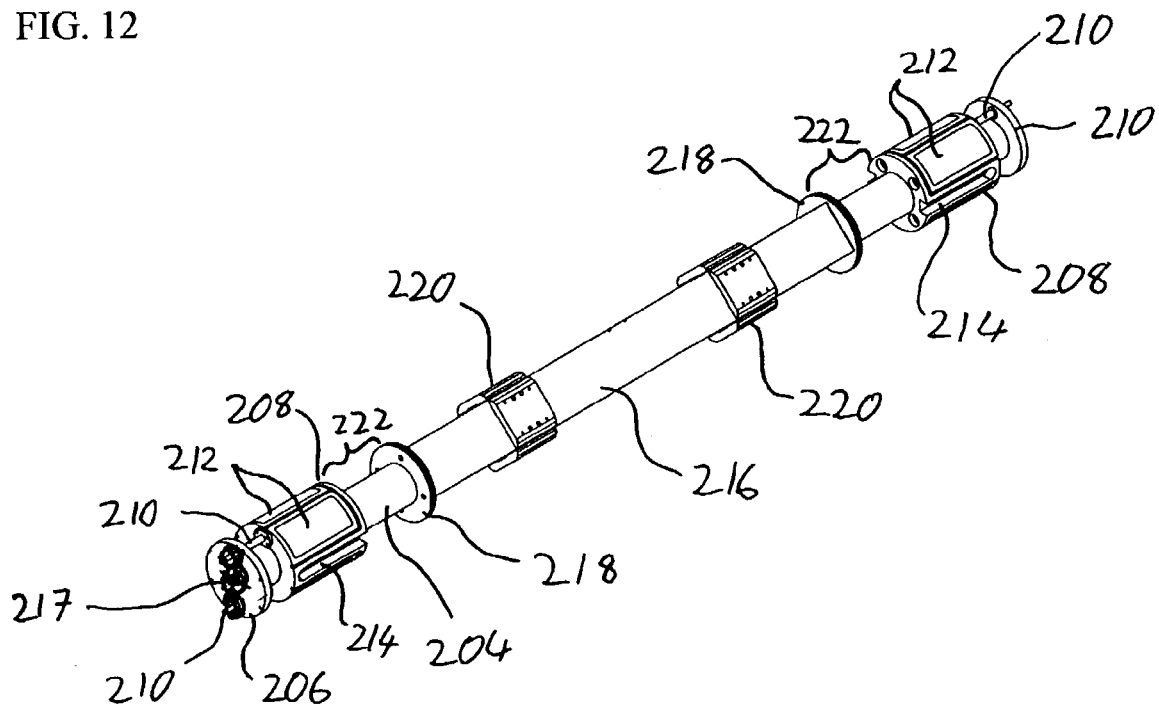
FIG. 12 is an isometric view of the scanner mechanism of FIG. 11 with an outer cylinder removed.

Specifically, FIG. 11 shows a scanner mechanism 200, constructed and operative according to the teachings of the present invention, in which the static base is a cylindrical housing 202. FIG. 12 shows scanner mechanism 200 with housing 202 removed to reveal the internal components.

The countermass assembly in this case includes a central bar 204 extending along all or most of the length of housing 202. At each end of bar 204 is fixed a flange 206 relative to which an air bearing collar 208 is adjustably held by bolts 210. In this case, adjustment is preferably controlled via a set of gears 217 by a small motor (not visible) deployed within each end of central bar 204. The motors are actuated via external electrical connections (not shown). Air bearing collars 208 have major air pads 212, supplied with air pressure via external openings 212a in housing 202, which support the countermass assembly for low-friction gliding within housing 202. Additionally, collars 208 each have a pressure control slot 214, aligned with a pressure control aperture 214a through housing 202, which is open towards the central region of housing 202. An air pressure control system (not shown) is associated with pressure control apertures 214a.

The carriage of this embodiment is implemented as a casing 216 circumscribing central bar 204 and terminating in two annular sealing flanges 218. The carriage is free to move axially within sets of air bearings 220 mounted on the inner surface of housing 202 which may be localized as shown or distributed along a major part of the range of motion of the carriage.

Regions 222 between each collar 208 and the adjacent annular sealing flange 218 thus define controllable air cells which provide various different functions under the control of the pressure control system. Specifically, when apertures 214a are open to the atmosphere, regions 222 are effectively open cells which have little effect on the motion of the carriage or countermass assembly. If the control system seals an aperture 214a, the corresponding region 222 becomes a sealed air-pocket spring which functions as a motion reversal arrangement. Where air pressure is actively supplied through an aperture 214a, region 222 becomes part of a pneumatic actuator which actively supplements the momentum of both the carriage and the countermass assembly. In all cases, forces act similarly on both the carriage and the countermass arrangement, thereby maintaining the balanced momentum of the system.

At this point, it will be clear that, as in the previous embodiment, the carriage and countermass assembly are both free to move with minimal friction along collinear horizontal paths relative to the base. This allows the combination of carriage and countermass to function as a substantially isolated inertial system. Additionally, suitable control of aperture 214a by selectively closing near the end of the range of motion provides a substantially-constant-velocity free-gliding motion over the active scanning path, as taught by the present invention.

Parenthetically, as mentioned above in the context of FIG. 2A above, it is possible to mount the carriage of the present invention on a track defined relative to the countermass assembly. It will be appreciated that such an implementation can readily be achieved as a minor adaptation of scanner mechanism 200 by mounting the carriage on inward-facing bearings cooperating with the outward-facing surface of central bar 204.

It will be appreciated that the above descriptions are intended only to serve as examples, and that many other embodiments are possible within the spirit and the scope of the present invention.

What is claimed is:

1. A scanning mechanism for moving a carriage across a substrate for inspecting or writing on the substrate, the scanning mechanism comprising:
   (a) a base;
   (b) a countermass structure slidingly mounted relative to said base so as to be slidable along a linear path;
   (c) a linear track associated with one of said base and said countermass structure, said linear track being parallel to said linear path;
   (d) a carriage cooperating with said linear track so as to be freely movable along said linear track; and
   (e) an actuator system configured to apply movement-actuating forces directly between said carriage and said countermass so as to generate acceleration of said carriage relative to said countermass structure,
   wherein said carriage and said countermass structure together form an isolated inertial system which is substantially isolated from externally applied forces parallel to said track.

2. The scanning mechanism of claim 1, wherein said carriage supports optical components forming part of an optical system for inspecting or writing on a substrate.

3. The scanning mechanism of claim 1, wherein said base includes a granite slab polished to provide at least two elongated planar surfaces defining said linear track.

4. The scanning mechanism of claim 1, wherein said carriage cooperates with said linear track via a plurality of air bearings.

5. The scanning mechanism of claim 1, wherein said carriage is untethered.

6. The scanning mechanism of claim 1, wherein said countermass has a mass at least five times greater than a mass of said carriage.

7. The scanning mechanism of claim 1, wherein a center-of-mass of a combination of said carriage and said countermass remains substantially stationary during said scanning movement.

8. The scanning mechanism of claim 1, wherein a center-of-mass of said carriage, a center-of-mass of said countermass and a line of action of forces generated by said actuator system are all collinear.

9. The scanning mechanism of claim 1, further comprising a base tilting mechanism configured to selectively generate an inclination of said linear path relative to a local horizontal.

10. The scanning mechanism of claim 1, wherein said actuator system includes a pair of momentum transfer configurations deployed so as to transiently convert kinetic energy of relative motion between said carriage and said countermass structure into potential energy and then release at least a portion of said potential energy as kinetic energy.

11. The scanning mechanism of claim 10, further comprising a path length adjustment mechanism adapted to vary a distance between at least two parts of said momentum transfer configurations, thereby varying a length of movement of said carriage.

12. The scanning mechanism of claim 10, wherein said momentum transfer configurations store said potential energy by compression of a quantity of air.

13. The scanning mechanism of claim 12, wherein each of said momentum transfer configurations includes a parallel-walled receptacle associated with a first of said carriage and said countermass, and a complementary plunger associated with a second of said carriage and said countermass, relative motion between said carriage and said countermass causing mating of said plunger and said parallel-walled receptacle so as to trap said quantity of air.

14. The scanning mechanism of claim 13, further comprising an injection system associated with said countermass and deployed for selectively add to said trapped quantity of air while said parallel-walled receptacle and said plunger are mated.

15. The scanning mechanism of claim 14, further comprising a control system associated with said injection system, said control system including a sensor arrangement deployed for deriving motion information indicative of motion of said carriage along said track, said control system being responsive to an output from said sensor arrangement to control said injection system so as to maintain a desired scanning speed of said carriage.

16. The scanning mechanism of claim 1, wherein said actuator system is configured to apply a force to said carriage along a minor part of a length of movement of said carriage, said carriage being substantially isolated from forces applied parallel to said track while moving along a major part of said length of movement.

* * * * *